W. H. KEMPTON.
MOLDING APPARATUS.
APPLICATION FILED OCT. 2, 1914.

1,184,857.

Patented May 30, 1916.

WITNESSES:
R. J. Fitzgerald
R. D. Brown

INVENTOR
Willard H. Kempton
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC AND MANUFACTURING COMPANY, A CORPORATION OF PENNSYLVANIA.

MOLDING APPARATUS.

1,184,857.  Specification of Letters Patent.  Patented May 30, 1916.

Application filed October 2, 1914. Serial No. 864,574.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Molding Apparatus, of which the following is a specification.

My invention relates to molding apparatus, and it has special reference to apparatus for making hollow articles from plastic molding material.

The object of my invention is to provide a mold of simple and convenient construction which shall be capable of applying positive pressure to all sides of the article being molded.

In molding solid objects from plastic material by means of molds of the type in which the molding pressure is applied by a plunger or ram working in a rigid shell, it is generally sufficient to apply pressure in one direction only, that is to say, in the direction in which the plunger moves. When, however, it is desired to mold hollow articles by this process, a different condition is presented. The solid core around which the article is molded prevents the pressure of the plunger from being evenly transmitted to the sides of the article, and the sides are therefore likely to be imperfectly compressed.

According to my present invention, I provide a mold of the plunger type for molding hollow articles, in which wedges are provided to apply pressure laterally as well as in the direction in which the plunger moves. The exact form of these wedges is determined by the nature and shape of the articles to be molded. If, for example, the molded articles are rectangular, the wedges should be disposed at two adjacent sides of the mold, positive pressure being thereby exerted in three separate directions perpendicular to each other.

Examples of molds embodying my invention are shown in the accompanying drawing, in which—

Figure 1:
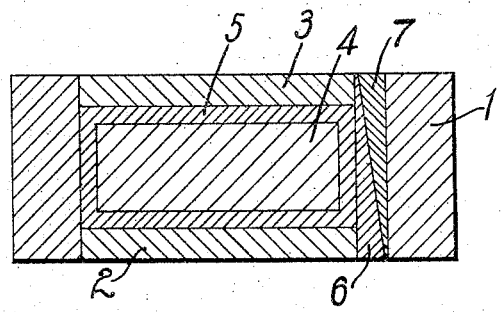
Figure 2:
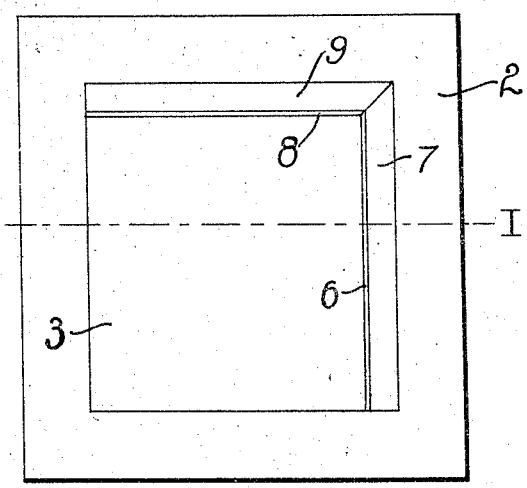

Figure 1 is a longitudinal sectional view taken substantially on the line I—I, Fig. 2, and showing a mold provided with two removable wedges for making hollow rectangular articles. Fig. 2 is a plan view of the form of my device shown in Fig. 1, and Fig. 3 is a longitudinal sectional view, similar to Fig. 1, showing a modified form of my device.

Referring to Figs. 1 and 2, a shell or matrix 1 is provided with a fixed lower plate 2 and with a movable upper plate 3, which is adapted to be forced toward the plate 2 by any convenient means. A core 4 is inclosed within the shell 1, and plastic material 5 is interposed between the core 4 and the surrounding walls. The parts thus far described afford means for applying pressure in a vertical direction only. In order to apply lateral pressure also, wedges 6 and 7 are provided at one side of the pressure members 2 and 3, and similar wedges 8 and 9 are provided at one of the adjacent sides. In the operation of this form of my device, the core and the molding material are placed in position within the mold, the wedges 6 and 8 are set in position in contact with the molding material and the wedges 7 and 9 are then driven in place beside the wedges 6 and 8. The proportions of the parts are such that, when the wedges have been driven into place, as shown in Fig. 1, the proper space remains for receiving the plunger 3, which is then forced downward to apply the proper pressure for completing the molding operation. The wedges 6 and 8 are placed in position first in order that there may be no friction between the wedges and the article being molded while the lateral pressure is being applied.

Figure 3:
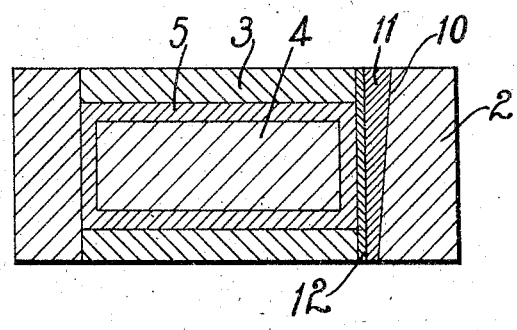

If it is desired to employ single wedges instead of the pairs of wedges shown in Figs. 1 and 2, the arrangement shown in Fig. 3 may be adopted. In this form of my device, two adjacent inner sides of the matrix 2 are inclined as shown at 10, and a single wedge 11 coöperates with the inclined face 10 to apply lateral pressure to the mold in the manner described above. I prefer to interpose a thin sheet 12, which may be of metal between the wedge 11 and the molding material 5, in order to avoid friction between the wedge and the molding material.

Numerous modifications may be made in the structures which I have shown and described without exceeding the scope of my invention. For example, hollow articles of hexagonal or other polygonal form may be made by providing molds having the proper number of sides and providing wedges of the form described above, adjacent to at least half of such sides. Furthermore, molds constructed in accordance with my invention may be operated either in multiple or individually, with equally good results. It is to be understood that my invention includes these modifications, as well as all others which fall within the scope of the appended claims.

I claim as my invention:

1. A mold for making shaped articles of plastic material comprising a plunger for applying pressure to the said articles in one direction, and a wedge for applying pressure to the said articles in another direction.

2. A mold for making shaped articles of plastic material comprising a plunger for applying pressure to the said articles in one direction and wedges for applying pressure to the said articles in a plurality of other directions.

3. A mold for making shaped articles of plastic material comprising a plunger for applying pressure to the said articles in one direction and a plurality of coöperating wedges for applying pressure to the said articles in another direction.

4. A mold for making shaped articles of plastic material comprising a plunger for applying pressure to the said articles in one direction and a plurality of sets of coöperating wedges for applying pressure to the said articles in a plurality of other directions.

5. A mold for making shaped articles of plastic material comprising a plunger for applying pressure to the said articles in one direction, a wedge for applying pressure to the said articles in another direction, and means for preventing friction between the said wedge and the said articles.

6. A mold for making shaped articles of plastic material comprising a plunger for applying pressure to the said articles in one direction, wedges for applying pressure to the said articles in a plurality of other directions, and means for preventing frictional engagement between the said wedges and the said articles.

7. A mold for making shaped articles from plastic material comprising a casing or matrix, coöperating pressure members therein for applying pressure to the said articles in one direction and a widge for applying pressure to the said articles in another direction.

8. A mold for making shaped articles from plastic material comprising a casing or matrix, coöperating pressure members therein for applying pressure to the said articles in one direction, and wedges adjacent to the said pressure members for applying pressure to the said articles in another direction.

In testimony whereof, I have hereunto subscribed my name this 29th day of Sept., 1914.

WILLARD H. KEMPTON.

Witnesses:
B. B. HINES,
M. C. MERZ.